April 30, 1968   R. F. PLATTNER ETAL   3,380,485
STRAPPING TOOL
Filed May 13, 1965   7 Sheets-Sheet 4
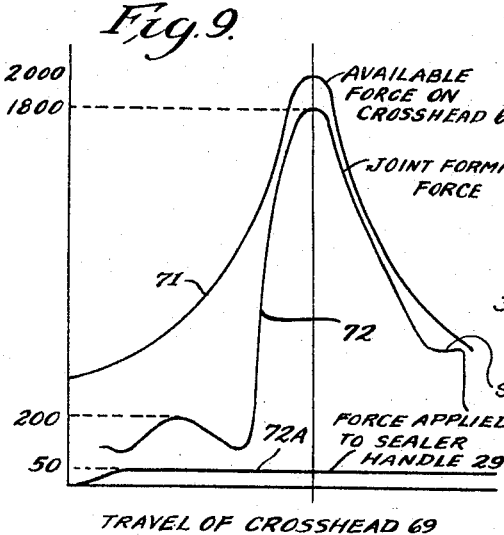
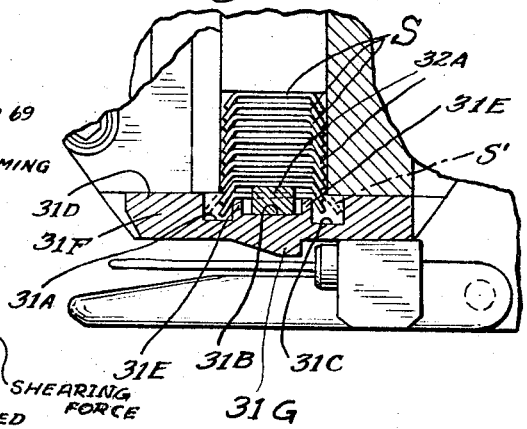
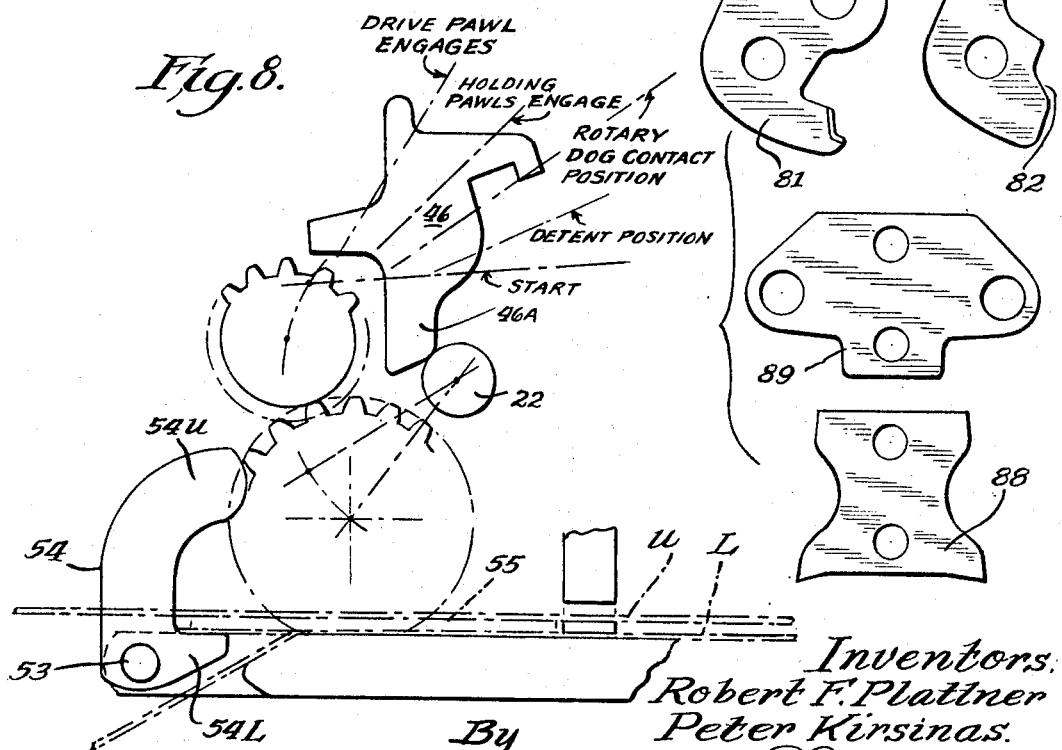
Inventors:
Robert F. Plattner
Peter Kirsinas.
By William P. Porcelli Atty.

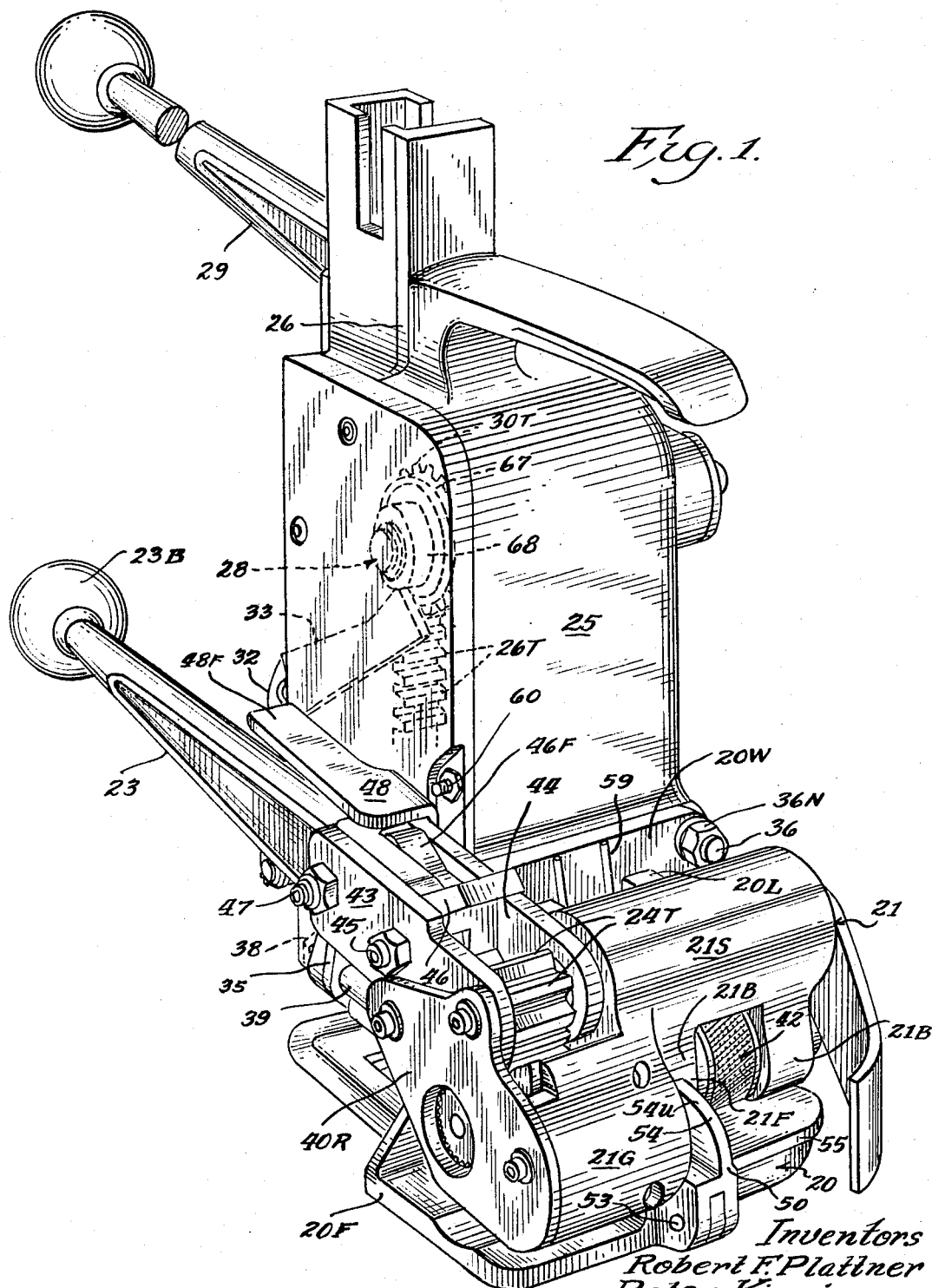

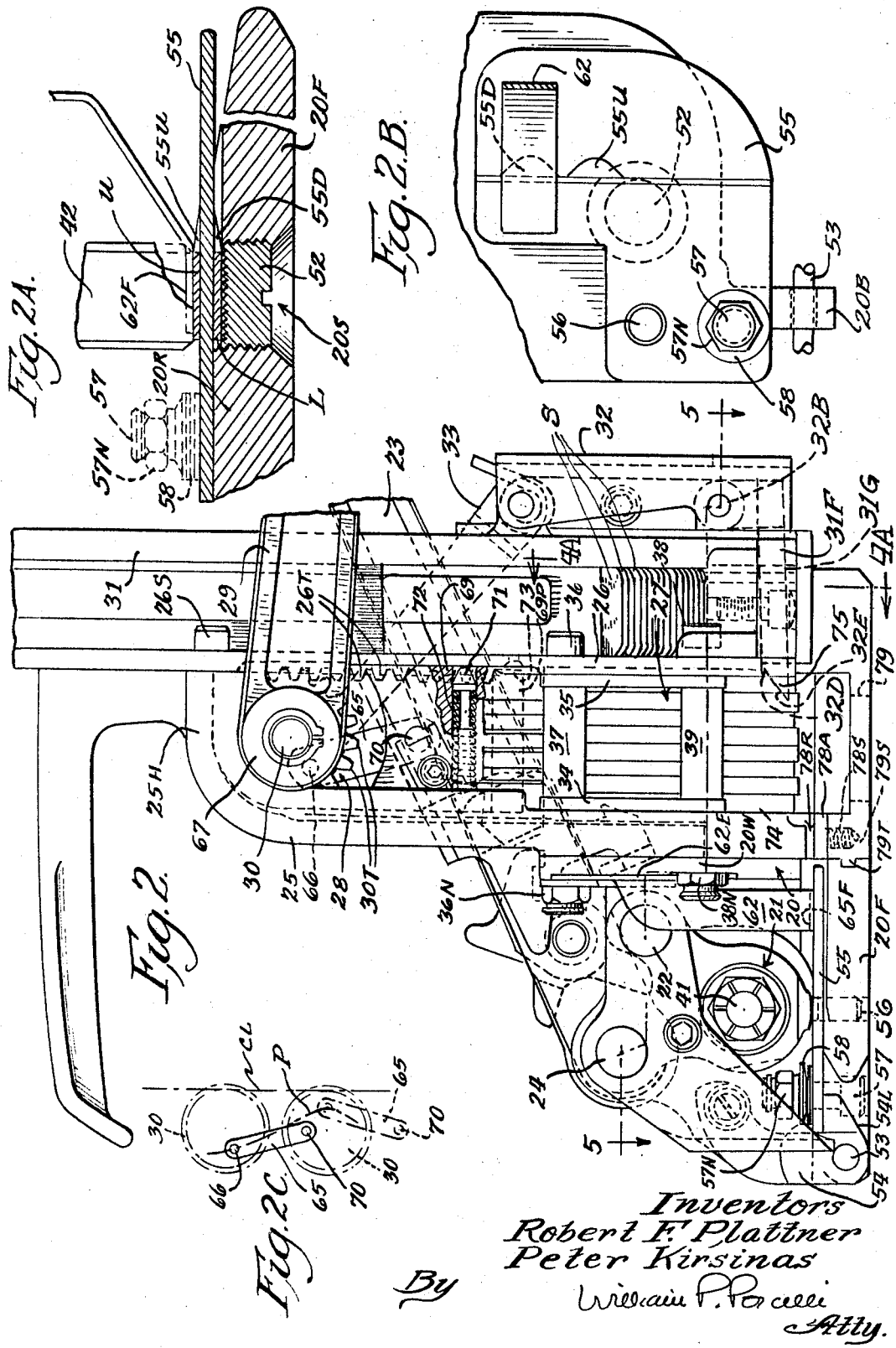

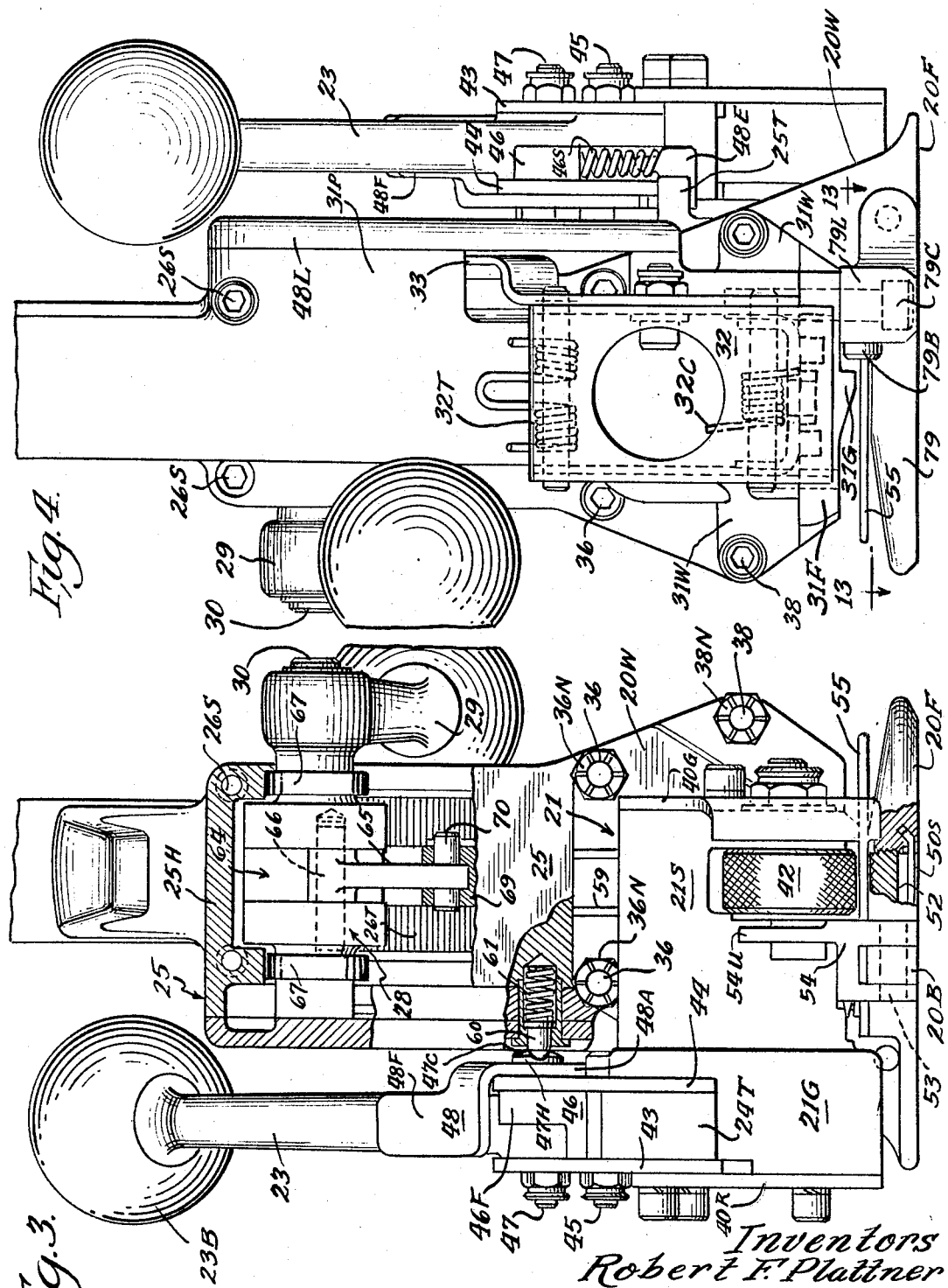

April 30, 1968 R. F. PLATTNER ETAL 3,380,485
STRAPPING TOOL
Filed May 13, 1965 7 Sheets-Sheet 5
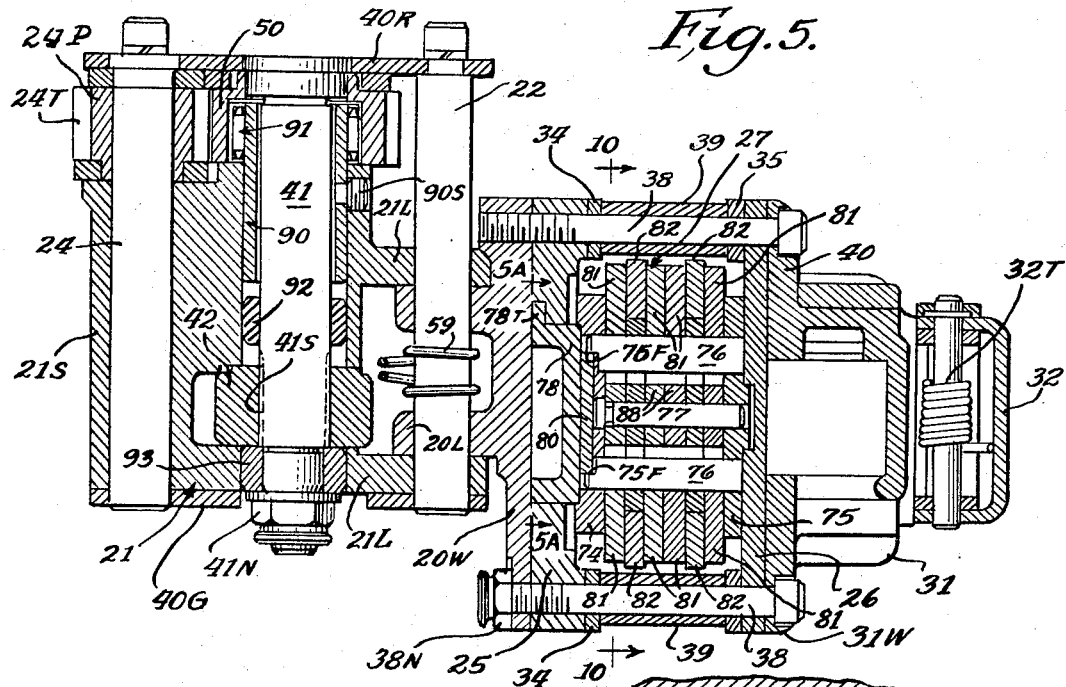
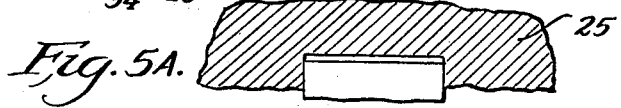
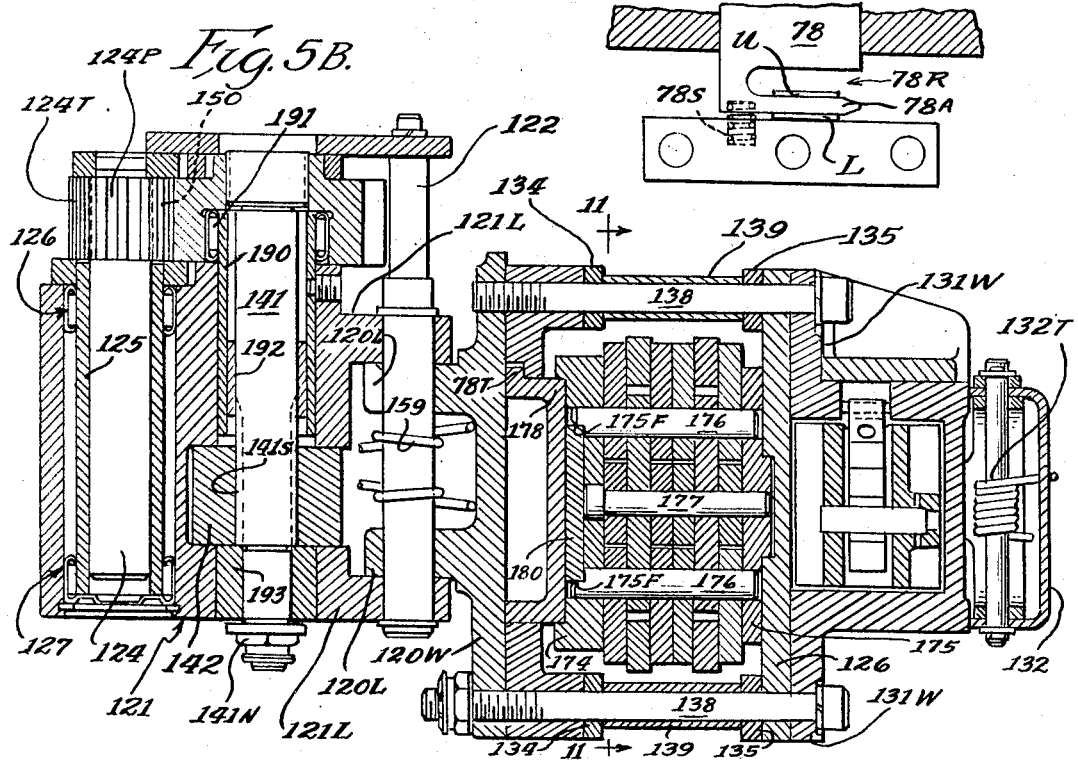

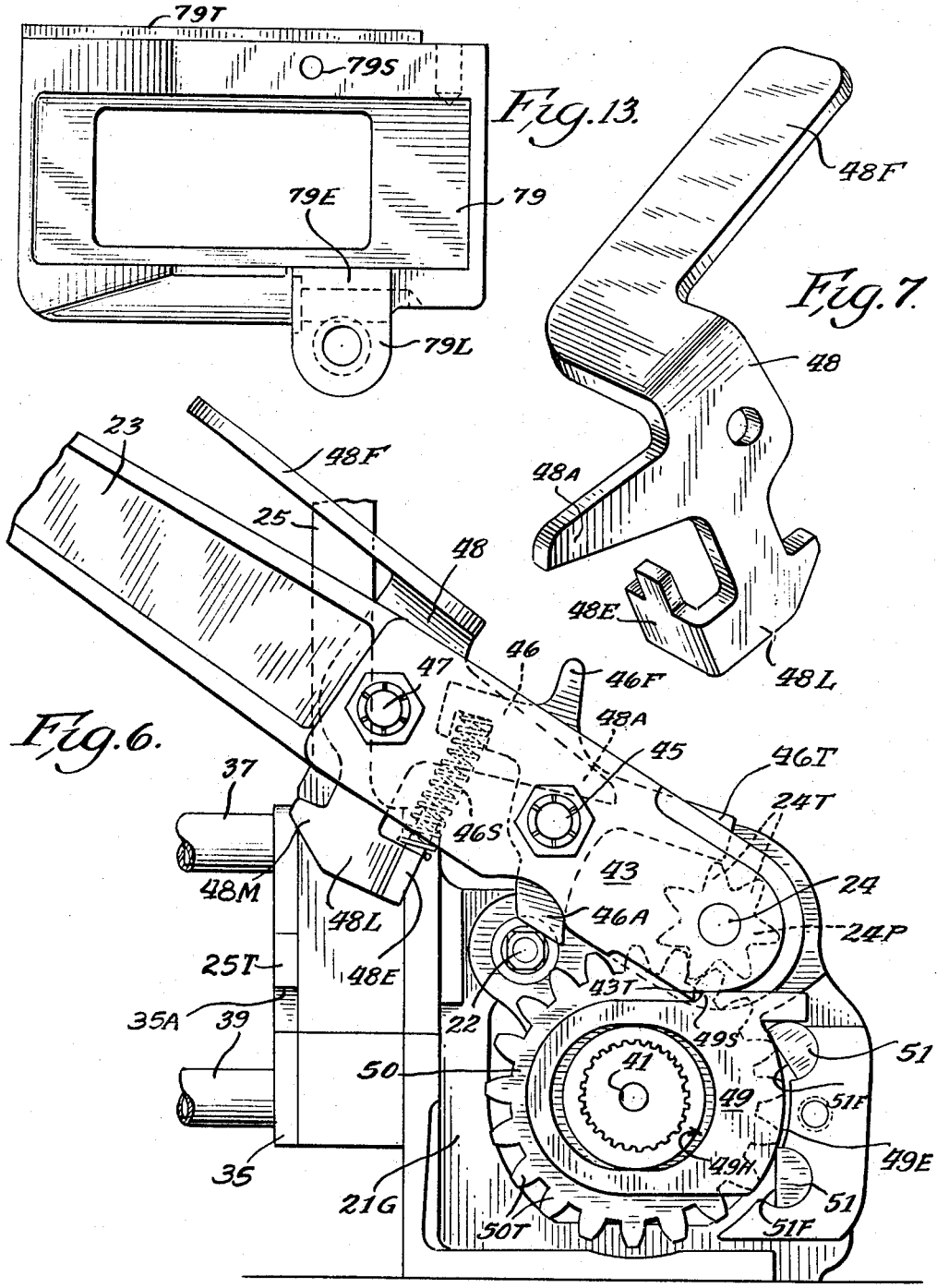

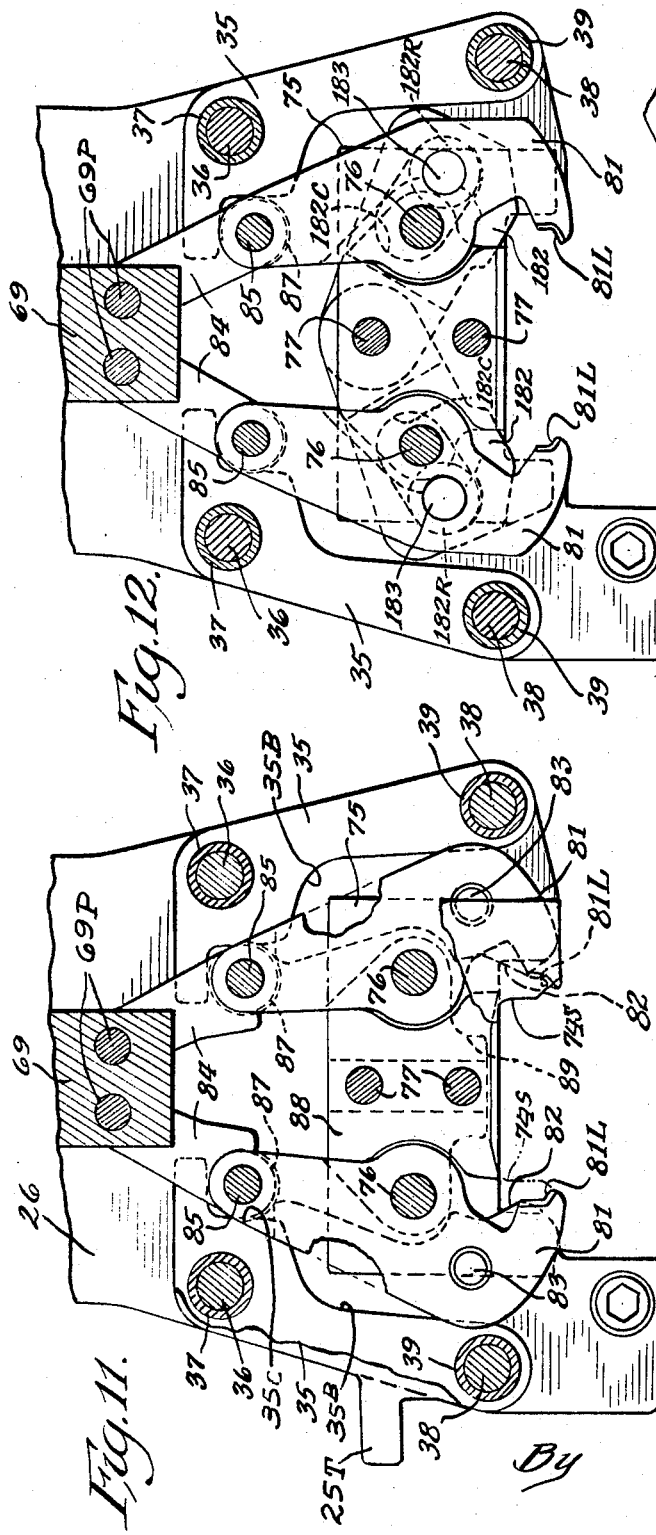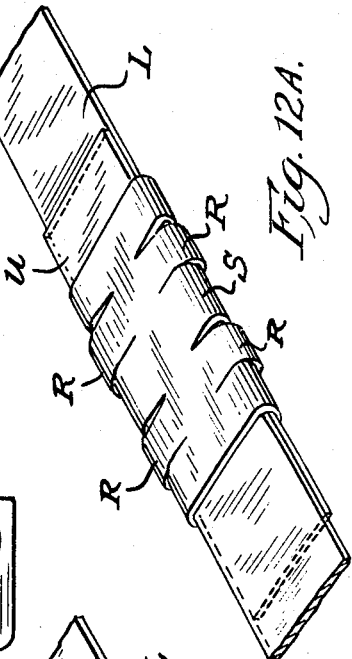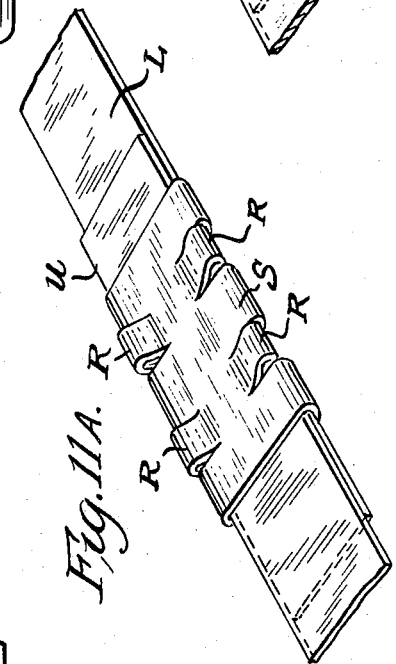

United States Patent Office 3,380,485
Patented Apr. 30, 1968

3,380,485
STRAPPING TOOL
Robert F. Plattner, Chicago Heights, and Peter Kirsinas, Hazel Crest, Ill., assignors to Interlake Steel Corporation, Chicago, Ill., a corporation of New York
Filed May 13, 1965, Ser. No. 455,400
28 Claims. (Cl. 140—93.4)

ABSTRACT OF THE DISCLOSURE

A strapping tool for tensioning and sealing together the ends of strap loop encircled about an object, having a stationary sealing mechanism housing with a removable strap support pad to provide access to the sealing mechanism and a wear-resistant and improved arrangement of journal mechanism for the tensioning mechanism. A variable mechanical advantage drive mechanism is positioned to actuate the joint forming mechanism to maximize the force required for joint formation. Improved strap shearing mechanism, strap guiding mechanism and joint forming mechanism is also provided.

This invention relates to a manual strapping tool of a type used for applying and crimping a seal to overlapping ends of a looped band and more particularly, is concerned with improvements in such a tool to enable a more uniform force application to the tool handle, to eliminate wear problems, to facilitate replacement of perishable parts, and to simplify actual operation of the tool through a complete cycle.

In the use of a manual strapping tool, the operating steps of a complete cycle include encircling an object to be bound with a length of strap or band in the form of a band loop, and manual loading of the lower and upper band ends in sequence on the tool, engaging the tool in gripping relation upon the band ends, tensioning the band loop by repeated actuation of a stretcher handle to drive a tension mechanism, actuating a sealer handle to apply a seal and form a joint between the seal and the overlapping ends of the tensioned band, and thereafter shearing the supply end and stripping the tool from the sealed band loop.

In the prior art, manual strapping tools for accomplishing this sequence have involved excessive complexity in operating steps and have been expensive to manufacture and difficult to maintain, and the present invention has for its principal object to provide a tool which is simpler to operate, easier to maintain, and more efficient in its performance.

Another object of the invention is the provision of a manual strapping tool wherein perishable parts such as the sealer jaws and punches, the shear blades and the parts of tensioning mechanism may be removed and replaced with a minimum of effort.

Still another object of the invention is the provision of a manual strapping tool wherein the stretcher assembly is movable to effect opening and closure of band contacting parts to facilitate insertion, alignment and gripping of the band ends and to facilitate ultimate stripping of the tool from the sealed band ends.

A further object of the invention is to provide a manual strapping tool suited for high tension applications and employing a stretcher drive arrangement exhibiting low friction and high wear-resistant properties and equipped with a manually releasable drive means to facilitate repositioning of the stretcher handle during the tensioning cycle, and equipped with holding pawl means that may be disengaged to relieve band tension whenever desired by a simple movement of the stretcher handle.

Another object of the invention is the provision of a manual strapping tool equipped with an interlocking lever on the stretcher handle to enable the tool to be latched in a fully open "Start" position wherein band loading and stripping are facilitated, with the interlocking lever being easily releasable at the start or during an operating cycle.

Still another object of the invention is the provision of a manual strapping tool having an easily removable base block structure underlying the sealer region to enable easy access to the sealer parts for repair or replacement.

A further specific object of the invention is the provision of a sealer drive mechanism operable along a cycloidal path arranged to proportion the mechanical advantage of the drive mechanism of the tool to the needs of the force system required for joint formation and thereby minimize the effort required to operate the tool.

Another specific object of the invention is the provision of an manual strapping tool having a detent mounted in its crosshead and determining an intermediate position wherein the sealer parts may function in guiding the band during tensioning.

It is still another object of the invention to provide an improved seal feed mechanism for feeding seals from a stack in a seal magazine to their position within the joint forming mechanism whereby accurate location of the seal feed mechanism relative to the seal feed path is insured and it allows certain portions of the mechanism to be used interchangeably with more than one width of seal.

It is another object of the invention to provide an improved seal feed mechanism having a minimum of parts and adapted to have camming means thereon for automatically causing proper seal alignment relative to the seal mechanism and for allowing the seal feed bar to be retracted by a camming action of the sealing mechanism against the seal feed bar.

Another object of the invention is to provide a structure and relationship of parts within the sealer assembly housing to minimize the number of wearing parts required and still maintain proper guiding of all of the parts. This minimizes the number of parts which must be hardened for wear purposes.

It is another object of the invention to provide improved sealing or joint forming mechanisms which are readily changed for either an upcut or downcut type of sealed joint between the overlapping strap ends and an encircling tubular metal seal.

It is still another object of the invention to provide an improved upcut type of joint forming mechanism which allows an overrunning of the toggle to relieve the forces on certain portions of the joint forming mechanism to provide more available forces for the shearing operation which immediately follows the joint forming mechanism.

It is still another object of the invention to provide an improved mechanism for forming the downcut joint which mechanism also provides movable punches timed to move in relationship to the movable jaws and which are guided in angular movement about a pivot by means of roller and slot engagement between the punches and jaws.

Other and further objects of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same, FIG. 1 is a perspective view of a manual strapping tool constructed in accordance with this invention and illustrating the general relationships when the tool is in its "Start" position;

FIG. 2 is a side elevational view of a manual strapping tool constructed in accordance with this invention;

FIG. 2A is a fragmentary sectional view through the base region of the tool illustrating the band loading and engagement relationships;

FIG. 2B is a fragmentary plan view of the base region shown in FIG. 2A;

FIG. 2C is a diagrammatic view illustrating the action of the sealer drive system in developing a mechanical advantage characteristic matched to the force requirements of the sealer;

FIG. 3 is a front end elevational view of the tool with upper regions of the sealer broken away to facilitate disclosure;

FIG. 4 is a rear end elevational view of the tool;

FIG. 4A is a fragmentary portion of the lower region of the strapping tool in cross-section as viewed along the line 4A—4A of FIG. 2;

FIG. 5 is a horizontal sectional view through the stretcher drive system and through the sealer parts;

FIG. 5A is a fragmentary sectional view taken approximately on the line 5A—5A indicated on FIG. 5;

FIG. 5B is a horizontal sectional vew through a modified embodiment and corresponds to the view shown in FIG. 5;

FIG. 6 is an enlarged side elevational view of the gear end of the stretcher drive system with outer cover pieces removed to facilitate disclosure;

FIG. 7 is an enlarged perspective view of a manual interlocking lever which is carried on the stretcher handle;

FIG. 8 is a diagrammatic side view illustrating operating relationships of the pawl and gear elements employed in the stretcher system and showing the various operating positions assumed by the center line of the stretcher handle;

FIG. 9 is a graph comparing the travel versus force characteristics of the sealer drive system and of the seal forming system utilized in the tool;

FIG. 10 is a collection of outline views of the principal parts of an upcut type sealer head assembly;

FIG. 11 is an enlarged sectional view through the parts of an upcut type of sealer head assembly.

FIG. 11A is a perspective view of a completed upcut type joint;

FIG. 12 is an enlarged sectional view through the parts of a downcut type sealer head assembly;

FIG. 12A is a perspective view of a completed downcut type joint; and

FIG. 13 is a plan view of a removable support pad that permits access to the sealer, the view appearing on sheet 5 of the drawings with FIGS. 6 and 7.

*General description*

Referring now to the drawings, and particularly to FIGS. 1, 2 and 3 thereof, a preferred embodiment of a manual strapping tool, constructed in accordance with this invention is shown for purposes of illustrative disclosure as including the following principal structural elements generally familiar to those skilled in the strapping tool art: a base casting 20; a stretcher drive housing 21 mounted for limited swinging movement about an axis defined by a pivot pin 22 that is carried on the base; a stretcher handle 23 mounted to rotate upon a shaft 24 carried by the stretcher drive housing 21; an upstanding sealer drive housing 25 assembled in fixed relation to the base 20; an upstanding stationary side plate 26 assembled in fixed fore-and-aft spaced relation to the housing 25 cooperably to define a vertical chamber to accommodate seal forming mechanism, generally indicated at 27, within its lower end and sealer drive mechanism, generally indicated at 28, within its upper end; a sealer handle 29 mounted to rotate about a floating shaft 30 of the sealer drive mechanism 28; a seal storage magazine 31 fixed on the rear face of the stationary side plate 26 and a seal feed arm 32 pivotally mounted to the rear of the magazine 31 and having a rigidly connected seal feed lever 33 that is engageable by downward movement of the sealer drive mechanism 27 to cock the seal feed arm 32. At the lower end of the seal feed arm 32 is a seal feed bar 32A which is pivotally mounted on a pin 32B which has thereon a spring 32C reacting between the seal feed arm 32 and the seal feed bar 32A to urge the seal feed bar 32A in a counterclockwise direction as viewed in FIG. 2. The inner end of the seal feed bar 32A is provided with a notch 32D which is used to engage the bridge of a seal S for feeding a seal S into the sealer assembly by transporting the seal from a stack of seals aligned vertically in the seal storage magazine 31.

The closure plate 31F is provided with three grooves 31A, 31B and 31C. The side walls of these three grooves all terminate at their upper surfaces in alignment with surface 31D. With the seal feed bar 32A urged downwardly against the closure plate 31F, its bottom surface is urged against the bottom of the groove 31B which maintains the feed bar in a fixed vertical position relative to the location of the lowermost seal S in the stack of seals in the seal storage magazine 31. The upper surfaces of side walls 31E of the groove 31B provide the supports for the lowermost seal S of the stack of seals and the level of a seal S supported on the upper surfaces of these side walls 31E is dimensioned identically to the level of the notch 32D in the inner end of the seal feed bar 32A. In this manner, no adjustment is required for accurate location of the seal feed bar relative to a seal for the seal feeding operation. When the seal feed bar 32A feeds a seal S, the sloped surface 32E on the inner end of the seal feed bar intersects the travel path of the sealer assembly. As the sealer assembly is later moved down vertically, the lowermost seal which has been fed into the sealer assembly is cammed down the sloping surface 32E of the seal feed bar for the purpose of centering the seal in proper alignment with the sealer parts. After the seal is properly centered, the side plate 75 of the sealer assembly cams against the surface 32E to cause the seal feed bar to be deflected out of the path of the sealer assembly.

The closure plate 31F is also provided with another advantage. The two grooves 31A and 31C are wide enough to accommodate two different width seals so that the same closure plate 31F can be used when employing either width seal. The outer walls of the grooves 31A and 31C are spaced so that the bottom edges of a wide seal S' contact the walls to properly align it relative to the sealer assembly. When employing the narrow seal S, the spacing of the walls 31E are such that the seal centers on these walls 31E.

The lower end of the magazine 31 is spanned by a separate closure plate 31F which serves as the floor of the magazine. Extending from the lower face of the closure plate 31F is a beveled band guide 31G for facilitating band insertion. The band guide 31G facilitates band insertion, especially in a situation where the upper band U might have slight upward bundle curve. The band guide 31G holds the lower band L, after it is inserted, in a position away from the closure plate 31F to provide a gap between the closure plate 31F and the lower band L into which the upper band U easily locates without any effort being required to separate the lower band L from the closure plate 31F.

The base 20 serves as a main structural element relating the fixed parts of the tool and it includes a horizontally enlarged contact foot 20F to be engaged against the package that is to be tied and an integral upstanding side wall 20W provided with laterally spaced apertured lugs 20L to receive the pivot pin 22 that mounts the stretcher drive housing 21.

The lower region of the vertical chamber which is defined between the opposed vertical faces of the sealer drive housing 25 and the stationary side plate 26 receives the seal forming mechanism 27. A pair of cam plates 34 are fixed to extend vertically along opposite sides of the lower face regions of the drive housing 25 and a corresponding pair of cam plates 35 are provided along the stationary side plate 26, all to cooperate with the seal forming mechanism 27 in a manner described hereinafter.

An upper set of bolts 36 are passed through the stationary side wall 26, the upper ends of the cam plates 34 and 35, the sealer housing 25 and the upstanding base wall 20W, and are equipped with spacer sleeves 37 abutting corresponding cam plates 34 and 35 to accurately determine the assembled spaced relation of these parts. Lock nuts 36N secure the bolts 36. Similarly, a lower set of bolts 38 are passed through these same parts and equipped with similar spacer sleeves 39 and a lock nut 38N. Each of the bolts 38 also extends through an integral wing 31W provided at the lower ends of the seal magazine 31.

The upper end of the sealer housing 25 has an integral horizontal wall 25H extending towards and abutting the stationary side plate 26 and a pair of headed lock screws 26S secure these parts together, with the lock screw 26S on the stretcher handle side of the tool also being passed through a wing portion 31P at the upper end of the seal magazine to fix these parts.

As best seen in FIGS. 1, 3 and 5, the stretcher drive housing 21 has a gear box portion 21G and a sleeve portion 21S offset laterally and integrally interconnected, with the sleeve portion 21S having rearwardly projecting lugs 21L straddling the forwardly projecting lugs 20L on the vertical base wall 20W to journal the stretcher drive housing 21 on the pivot pin 22. At the open side of the tool, the stretcher drive housing 21 is flanked by a conventional band guide 40G that moves with the housing 21 (FIGS. 2, 3, and 5). At the opposite side of the tool, the stretcher housing 21 is flanked by a retaining plate 40R (FIGS. 1, 3 and 5) that enables access to the gear box portion 21G. The sleeve portion 21S has bearing portions 21B (FIG. 1) extending downwardly in laterally spaced relation to receive a rotary dog shaft 41 which has a splined intermediate portion 41S between these bearing portions 21B to receive a rotary dog 42.

The stretcher handle 23 is equipped with laterally spaced rigidly secured outer and inner mounting plates 43 and 44, respectively, each apertured to ride in journalled relation on the outboard end of the shaft 24. This shaft 24 has journalled thereon a pinion 24P which is located at the region between the mounting plates 43 and 44, and is provided with integral pinion teeth 24T. One of the mounting bolts 45 by which the mounting plates 43 and 44 are rigidly secured to the stretcher handle 23 also serves as a pivot pin for a drive pawl 46 (FIGS. 6 and 8) which is nested between the mounting plates 43 and 44 to establish a ratcheting driving engagement when the end 46T of the drive pawl 46 engages the pinion teeth 24T. The other mounting bolt 47 for these plates serves as a pivot pin for a lever 48 (FIGS. 6 and 7) which has an integral actuating finger 48F overlying the stretcher handle 23, and an integral locator arm 48A extending alongside the inner mounting plate 44 to engage the head of the first mounting bolt 45 and determine one limit of rotation of the lever 48. Finally, the lever 48 has an integral depending cam latch 48L having a bent end 48E serving as a seat for a bias spring 46S which acts upon the drive pawl 46 normally to hold it at a position for engagement with the pinion teeth 24T. The drive pawl 46 has an upstanding abutment 46F for finger manipulation to enable disengagement of the drive pawl whenever it is desired to reposition the stretcher handle. The cam latch 48L of the lever 48 is also provided with a hooked portion 48M which is adapted to engage the lower surface 35A of a projecting tab 25T of the cam 35 for the purpose of retaining the stretcher handle 23 in its initial "at rest" position. When the lever 48 is initially depressed, this hooked portion 48M is released from the projecting tab 25T to allow the stretcher handle 23 to elevate into its other positions.

The pinion 24P with the gear teeth 24T rotates with the stretcher handle 23 whenever the handle moves in a counterclockwise direction as viewed in FIG. 2. This pinion 24P drives a rotary dog gear 50 (FIG. 6) carried on the end of a sleeve 90 and located within the lower region of the gear box portion 21G of the stretcher drive housing 21. Upon reverse or clockwise rotation of the stretcher handle 23 as viewed in FIG. 2, the drive pawl 46 ratchets on the pinion 24P and the pinion and shaft 24 and shaft 41 remain stationary.

The position of the shaft 41 and hence of the rotary dog 42 must normally be maintained to prevent loss of tension and enable the action of the stretcher handle 23 to build up the desired band tension. For this purpose, the gear box portion 21G of the sealer drive housing 21 mounts a pair of cooperating half stepping pawls 51 each in the form of a pin having an elongated region provided with a flat 51F to engage the teeth 50T of the rotary dog gear 50. The pawls are spring loaded by suitable spring means to urge the pawl counterclockwise (FIG. 6) against the gear 50 to resist clockwise movement of the gear 50. The outboard side plate 43 has a tang 43T to engage a shoulder 49S on the upper corner of a plate 49 which has an oval opening 49H to float on the hub of gear 50 and control disengagement of the pawls 51. The retaining plate 40R holds the plate 49 and pawls 51 in proper position.

The foot portion 20F of the base casting 20 is provided with a socket 20S (see FIG. 2A) to receive an insert button 52 of familiar form having a knurled face to engage upwardly in gripping contact with a lower band portion L. The foot portion 20F also has an integral boss 20B located along its front edge and projecting outboard and upwardly to receive a roll pin 53 for pivotally mounting a lifting link 54 which has a lower arm 54L recessed in the foot section and an upper arm 54U projecting to a location to contact the stretcher drive housing 21 and enable pivoting movement of the stretcher drive housing about the pin 22 to cause pivoting movement of the lifting link about the pin 53. A separating plate 55 (FIG. 2A) is loosely seated upon a raised region 20R centrally of the foot section 20F of the base to overhang the base in a cantilever fashion. For this purpose, a vertical lock pin 56 that is carried in the foot section 20F of the base projects through an aperture in the separating plate 55 and a cap screw 57 and nut 57N are also mounted from the base and project through an aperture along the same side of the separating plate, with the nut 57N being spaced above the separating plate and with a disc spring 58 encircling the cap screw 57 and reacting against the nut normally to bias the separating plate downwardly to a position where it may hold the lower band against the button 52. The lifting link 54 has its lower arm 54L nested in an edge notch of the foot section 20F to accommodate the desired downward movement of the separator plate 55. The stretcher drive housing 21 is swingably movable about the pivot pin 22. One limit of the housing movement is the latched position and is illustrated in FIG. 1 wherein a flat 21F on this housing contacts the upper arm 54U of the lifting link and pivots it in a direction to elevate the separator plate 55 to enable sufficient clearance for the lower band to be inserted with ease or to enable the lower band to be stripped from the tool following a seal cycle. This latched position of the parts of the tool may be described as the "at rest" position as the stretcher handle 23 is automatically retained by engagement of the cam latch 48L of the release lever with a tang 34T that projects sidewards from a fixed front cam plate 34.

In this "at rest" position it will also be noted that the rotary dog 42 is spaced above the separator plate 55 to enable stripping of the upper band U from between the dog and the separator plate. The stretcher handle 23 is movable from this "at rest" position by squeezing the release lever 48 towards the stretcher handle 23 to free the cam latch 48L of the tang 34T and enable a coiled wire spring 59 which encircles the pivot pin 22 and reacts against the upstanding wall 20W of the base casting and the sleeve portion 21S of the stretcher drive housing normally to urge the stretcher drive housing 21 towards a lowered position. The stretcher handle 23 moves in unison with the stretcher drive housing 21 to a detent position wherein a detent pin 60 carried in the sealer housing 25 and projecting laterally therefrom, under the action of a load spring 61, contacts a hex head 47H on the mounting bolt of the stretcher handle and arrests further movement. At this detent position, the stretcher drive housing 21 has pivoted towards the separator plate 55 sufficiently to permit the lifting link 54 to float and allow the disc spring 58 to impress the separator plate in gripping engagement on the lower band. At this detent position the rotary dog 42 will still be spaced clear of the separator plate 55 to allow feeding of the upper band.

The separator plate 55 has a downward depression 55D and an upward depression 55U presenting aligned abutments for the lower and upper band ends L and U, respectively.

A band spring 62 has one end 62E anchored to the vertical wall 20W and has its free end 62F (FIG. 2B) overlying and biased against the upper surface of the separator plate 55 to insure snug retention of the upper band after its insertion. After the upper band U is in place, the stretcher handle may be operated manually to overcome the resilient holding action of the detent pin 60. It may be noted that the hex head 47H has a circular chamfer 47C to facilitate the detent release under manual actuation. Upon movement of the stretcher handle beyond the detent position, the wire spring 59 forcibly urges the rotary dog 42 into contacting engagement with the upper band to grip it against the separator plate 55. The stretcher handle may then be repeatedly actuated to tension the band. One advantage of the arrangement is that excess slack in the band loop may be pulled through the rotary dog 42 manually until the band is snug about the package at which time the stretcher handle 23 is employed for building up the desired tension.

The sealer drive mechanism 28 includes a one piece shaft and pinion element 30. Thus the shaft 30, at an intermediate region, has integrally formed laterally elongated pinion teeth 30T meshing with laterally spaced sets of rack teeth 26T which are integrally formed and arranged in a pair of vertical rows along the stationary side plate 26. The one piece element 30 has a central region of its tooth periphery notched out to define a socket 64 for receiving the upper end of a drive link 65 which is pivotally connected on a captive cross pin 66 which bridges the socket 64 and seats in the base regions of the pinion teeth 30T. Rollers 67 are journalled on the shaft 30 to flank the pinion teeth 30T and ride vertically through the sealer chamber. At one end, the shaft 30 receives a collar 68 (FIG. 1) for engagement with the actuating lever 33 of the seal feed mechanism and the other shaft end is extended outboard of the sealer drive housing 25 and receives the sealer handle 29. The lower end of the drive link 65 is pivotally connected to a cross head 69 by means of a cross pin 70. The cross head 69 is equipped with one or more cross head pins 69P (FIG. 2) to control the seal forming mechanism 27.

Upon rotation of the sealer handle to lower the cross head 69 the shaft and pinion element 30 rides downwardly through the sealer chamber and the cross pin 66 which transmits force to the drive link 65 generates a cycloidal path P (see FIG. 2C) and moves from a start position wherein the pin 66 is spaced a maximum from the rack teeth 26T to an intermediate peak position wherein the pin 66 is closely adjacent the crest line CL of the rack teeth 26T and then to a final position wherein it is spaced slightly more from this crest line. During this movement, the cross head 69 and cross pin 70 remain centered in the mounting chamber.

In generating this cycoidal path, when the cross pin 66 is at the start position to the front of the axis of the shaft and pinion element 30, the line of action of the drive link 66 is such that reaction transmitted through the link impresses the rollers 67 against the inside face of the vertical wall of the seal drive housing 25 and when the cross pin 66 moves to the rear of the axis of the shaft and pinion element 30, the drive link 65 then transmits force along an oppositely inclined angle so that the reaction through the drive link 65 in this latter stage of movement holds the pinion teeth 30T against the rack teeth 26T and minimizes the force of the rollers 67 as they ride against the sealer drive housing. This drive action wherein the line of action of the link 65 is tilted obviates severe wear problems which would otherwise be occasioned due to the spreading force which inherently acts between a rack and pinion. During the initial part of the sealer drive stroke, the rollers 67 do act against the sealer housing but the reaction forces during this stage are low and easily accommodated by a low strength sealer housing such as a cast aluminum body which is preferably employed. During the latter stages of the sealer drive stroke, the force acting through the drive link 65 peaks, due to the action of the sealer jaw and punch assembly, but at this time the cross pin 66 has moved over center so that the link applies a component of force directly opposing the gear spreading force and relieves the rollers from excessive pressure against the sealer housing. During the high force interval, the contact face of the crosshead 69 which is substantially wider than the roller face is in smooth sliding engagement against the sealer housing 25 and its greater area enables the loading to be handled with ease.

The sealer drive arrangement offers another advantage related to providing applied forces of a magnitude related to that which is required for the joint forming operation without any appreciable variation in the forces required to be applied to the sealer handle 29. In FIG. 9 is shown a graph wherein the vertical axis represents forces in pounds and the horizontal axis represents travel of the crosshead 69. The curve 71 represents the available forces on the crosshead as a result of the rack and pinion arrangement including the link 65. The curve 72 shows the forces required at the crosshead for forming a joint between the overlapping bands and for the other operations related to the sealer mechanism, such as the folding of the seal prior to joint formation, and cocking of the seal feed lever 32 and operation of the shear 80. Referring to both FIG. 2C and FIG. 9, the arrangement of the link 65 relative to the rack and pinion is such that the maximum mechanical advantage in the drive arrangement exists in the peak region of the curves 71 and 72. As an example, although 1800 pounds is required for joint forming as shown by the peak of curve 72, due to the mechanical advantage existing in the drive arrangement, 2,000 pounds of force is available on the crosshead as indicated by the curve 71. This mechanical advantage is provided by the ratio of the length of the handle 29 to the distance between the center of the cross pin 66 and the rack teeth 26T at any particular position of the crosshead 69.

This distance is greatest at the start position so that a given rate of angular movement produces relatively fast crosshead travel and this distance reaches a minimum when the punches rupture the band so that the same rate of angular movement of the sealer handle 29 produces relatively slow crosshead travel and affords a high mechanical advantage tending to smooth out the force required to be applied to the sealer handle 29 as it is moved through its 180 degree angular travel path. With the arrangement shown, it is possible to require substantially uniform small force on the sealer handle 29 as indicated, for example, by curve 72A which shows a uniform force required of only 50 pounds, even though the maximum available force on the crosshead 69 is 2,000 pounds at the maximum peak.

When the tool is in its "at rest" position, as pictured in FIG. 1, the shaft and pinion element 30 is at the top of the seal chamber and the crosshead 69 is elevated. The crosshead 69 is fitted with a detent pin 71 (see FIG. 2) biased by means of a load spring 72 to act against the stationary side plate 26. A counter sink 73 is provided in this plate a short distance below the elevated position of the detent pin 71 to receive the detent pin and determine a detent position for the crosshead 69.

The sealer jaw and punch assembly of the seal forming mechanism 27 may be either of an upcut type (FIG. 11) to produce a final seal configuration (FIG. 11A) wherein the ruptured portions R are deflected upwardly or of a downcut type (FIG. 12) to produce a final seal configuration (FIG. 12A) wherein the ruptured portions R are deflected downwardly. In the upcut type of FIG. 11, the sealer jaw and punch assembly includes front and rear side plates 74 and 75, respectively. The front side plate 74 is provided with depending band guide surfaces 74S (FIG. 11) that span the overlapping ends of the band after proper insertion thereof. The surfaces 74S serve to retain the desired alignment of the band while slack is being pulled out of the band loop and while tension is being applied to the band and the band finally sealed. The sealer mechanism includes pairs of jaw pivot pins 76 and bridge holding pins 77, with the ends of these pins 76 and 77 seating in the side plates 74 and 75.

A stationary shear blade 78 (FIG. 5) is mounted within and alongside the lower front region of the sealer housing 25 which is appropriately recessed to accommodate a limited vertical floating movement for the stationary shear blade. A tang 78T along one vertical edge of the stationary shear blade 78 nests in a corner cut out of the sealer housing 25 to prevent tipping of the stationary shear blade 78. The stationary shear blade 78 has a relieved region 78R (FIG. 5A) defining a cantilever arm 78A that extends immediately adjacent the separator plate 55 also to separate the upper and lower portions of the band. The floating mounting of the stationary shear blade 78 allows its cantilever arm 78A to seat intimately against the lower band and thereby avoids imposing severe cantilever action during band shearing. A lifter spring 78S (FIG. 5A) is located within a removable base pad 79 to underlie and act upwardly against the stationary shear blade 78 normally to hold it elevated sufficiently to accommodate insertion of the lower band beneath the arm 78A.

The base pad 79 as shown in plan view in FIG. 13 has a thickened edge 79E provided with an offset integral lug portion 79L, apertured to receive a cap screw 79C (FIG. 4), the only fastener holding the base pad 79. The base pad has a socket 79S for the spring 78S and has an edge tang 79T to nest in an edge notch of the base 20. The thickened lug portion 79L has a transverse hole to receive a guide button 79B (FIG. 4) against which the band edges are slideable.

A movable shear blade 80 is nested alongside the stationary shear blade 78 and it is arranged to be moved down upon downward movement of the cross head 69 to sever the upper band after folding of the seal and during deforming of the seal with overlapped band ends, with the shearing action occurring at a region of the band which is under tension. The movable shear blade 80 is nested within the movable front side plate 74 and is associated with flats 75F provided at the front ends of the jaw pivot pins 76 to hold these pins against rotation during sealer actuation.

The arrangement of the parts within the seal drive housing 25 is such that the tool can be conveniently disassembled for repair. Upon removal of the base pad 79 by removing the single cap screw 79C, the stationary shear blade 78 is immediately removable by sliding motion out of the seal drive housing 25. Likewise, upon removal of the crosspin 70, the entire sealer assembly can be removed, including the removable shear blade 80. This provides an extremely simple means for servicing the tool. The stationary shear blade 78 is preferably a hardened steel piece slidably mounted on the seal drive housing 25 which is not hardened. The sealer assembly has its side plate 74 contacting the edges of the shear blade 78 to guide the sealer assembly in its travel. The side plate 74 is preferably hardened and the result is that these contacting surfaces which are subject to wear are the only surfaces necessary to be hardened. Since there is no direct wear on the sealer drive housing 25, there is no need for it to be hardened.

Outline views of the jaws 81, the punches 82, the bridges 88 and the tie bars 89 for the upcut mechanism of FIG. 11 are shown in FIG. 10.

Four pairs of identical jaws 81 are incorporated in the sealer mechanism with the central pairs of jaws being adjacent to each other and being separated from the outer pairs of jaws by intervening pairs of punches 82. The punches 82 are mounted on pivot pins 83 which extend through the stacked array of jaws and the upper ends of the jaws are connected to lower ends of a pair of spreader links 84 by means of link pins 85, with the upper end of each spreader link 84 being pivoted to the cross head 69 by a cross head pin 69P. The sealer mechanism is regulated by the cam plates 34 and 35 which are fixed as previously described. The link pins 85 of the sealer are equipped at their ends with cam rollers 87 that ride along the surfaces of the cam plates 34 and 35 to regulate the timing of the jaw action during downward movement of the cross head 69. Each pair of jaws 81 has a centrally located bridge 88 associated with it and each pair of punches 82 has a centrally located tie bar 89 associated with it, with the bridges 88 and tie bars 89 constituting a stacked array. The tie bars 89 function as spacers in this array and also serve to restrict the movement path of the punches 82.

The jaws 81 terminate at their free ends in retention lips 81L that guide the seal when it is being fed into the sealer head 27 and hold the seal over the two overlapping band ends to insure alignment after the sealer head is lowered into the intermediate position and while tension is applied.

The parts of the downcut sealer of FIG. 12 are similar in many respects to those of the upcut sealer of FIG. 11. In the downcut sealer, however, the punches 182 are substantially different and are both pivoted on the upper bridge pivot pin 77. The punches 182 are formed with elongated cam slots 182C having cam rollers 182R operable therein. Punch actuator pins 183 extend through the aligned stacks of jaws 81 and punches 182 and carry the rollers 182R to cause the swinging movement of the jaws 81 to drive the punches angularly about pivot pin 77 while the slots 182C are guided between cam rollers 182R. As this occurs, the punches 182 move toward each other to form the downcuts R of the joint as shown in FIG. 12A.

The particular action of the jaws 81 and the punches 82 of FIG. 11 for the purpose of forming an upcut joint between the overlapping band ends U and L is characterized by having both the jaws and punches pivotally movable. In the most common type of joint forming mechanism, the punches are stationary. When the punches are located properly for an upcut seal, the sealer mechanism does not lend itself to use in a strapping tool employing feeding of seals from a stack because the stationary punches are ordinarily in the seal feed path. By having the punches 82 movable to and from sealing position, they can be cleared of the seal travel path during the seal feed operation. More particularly, the action of the mechanism shown is that the jaws 81 move toward each other to initially bend the legs of a seal S around and beneath the band ends. During the final wrapping action of the seal legs, the linkage arrangement is such that the punches 82 begin to form the upcuts R at the edges of the seal joint. The angular movement of the punches 82 occurs by action of projecting corners 84A on the links 84. As the links 84 are pivoted sufficiently, these corners 84A engage the upper ends 82A of the punches 82 to cause the angular movement upon continued pivoting motion of the links 84. The bridges 88 react against the other portions of the seal S to maintain them in a fixed position while the upcut portions R are being deflected. The arrangement of the toggle formed by the links 84 and the jaws 81 is such that the folding action of the seal legs is completed prior to the final movement of the crosshead 69 and as the pins 85 have reached their furthest positions apart. Continued downward movement of the crosshead 69 actually causes an overrun of the toggle which provides slight reverse movement of the jaws 81 while the punches 82 complete the upcuts R. The advantage of this is that the folding of the seal legs is completed prior to the formation of the upcuts R. On other devices, this is not generally the case and the result is a joint with the legs of the seal protruding slightly downwardly away from the joint without achieving a flat joint.

As the linkage proceeds past toggle and the jaws 81 are retracted away from contact with the seal joint, the loading of these jaws 81 on the joint is relieved so that more force is available for the shearing operation which immediately follows at the extreme final travel portion of the crosshead 69. The cam surfaces 35B of the cams 35 are shaped to prevent the jaws and punches from closing prematurely on the forward stroke, to insure that the jaws and punches are opened on the return stroke and to limit the upward travel of the entire sealer assembly on the return stroke. Any premature closing of the punches and jaws prior to locating the punches and jaws in their proper aligned position relative to the overlapping band ends can cause faulty formation of a joint. The regions 35C of the cams 35 keep the jaws and punches in their open position until the sealer assembly is properly positioned. After the surfaces 35C are passed, the cam surface is shaped to allow outward movement of the rollers 87 to permit the toggle effect to take place and close the jaws and punches to complete a strap joint.

As mentioned previously, the downward movement of the drive pinion 30 causes the collar 68 to engage the seal feed lever 33 and cock the seal feed arm 32 in preparation for feeding the next seal. As is conventional, the seal feed arm 32 is biased by a torsion spring 32T (FIG. 5) to produce seal feeding rotation thereof and actuate the usual seal feed finger (not shown) which is arranged to underlie the seal magazine 31 for picking up the next seal and urging it against the rear movable side plate 75. The side plate 75 is at a down position by the time the seal feed arm 32 is free to uncock. Actual seal feed is delayed until the crosshead 69 has completed its full down stroke and has almost completed its upward or return movement, when the movable rear side plate 75 has moved clear of the next seal and allows the seal to enter the now open jaws 81 to be retained on the jaw lips 81L. The seal is fed forward until it engages the movable front side plate 74. Upon subsequent downward travel of the crosshead during the next seal cycle, the jaws deposit the seal on the overlapping band ends and then fold and crimp it.

Returning to the stretcher construction, in FIG. 5 the rotary dog shaft 41 is shown journaled in a hardened steel sleeve 90 which is held by a set screw 90S. One end of the sleeve 90 is encircled by a needle bearing assembly 91 on which the rotary dog gear 50 is rotatable.

Oil impregnated sintered bearing rings 92 and 93 are spaced along the rotary dog shaft 41 to flank the rotary dog 42 and provide long-lived, low friction bearings, with the end of the shaft 41 receiving a hex nut 41N which is the only element required to be removed in order to withdraw the shaft 41 and enable replacement of the dog 42.

The drive arrangement illustrated in FIG. 5 is intended for a relatively low tension duty cycle, but where high band tension arrangements are employed, a modified stretcher drive arrangement such as is shown in FIG. 5B may be employed. In FIG. 5B the corresponding parts bear corresponding reference numbers in the 100 series. Certain of the parts of the sealer and seal storage magazine are referred to by identical reference characters.

The high tension stretcher drive arrangement has a one-piece pinion and shaft element 124 journalled in a tool steel pinion sleeve 125 which is, in turn, journalled in a pair of needle type roller bearing assemblies 126 and 127 housed within a cylindrical socket provided in the sleeve region 121S of the stretcher drive housing 121. The gear ratio between the gears 24T and 50 is much lower than that between the gears 124T and 150 to enable higher band tension to be achieved in the FIG. 5B arrangement.

In the case of both FIGS. 5 and 5B, the tool steel mounting sleeves 90, 190 and 125 and oil impregnated sintered bearings 92, 93, 192 and 193 achieve wear-resistant operation and the primary element to be replaced is the rotary dog, this being accomplished simply by removing the nut 41N or 141N.

With the arrangement shown in both FIGS. 5 and 5B, it is possible to provide shafts 24, 41, 124 and 141 with a composition of steel and a heat treat which will provide fatigue resistance or toughness and torsion and bending strength. These characteristics are obtained at lower hardness of the metal than would be required for a bearing surface. In order to provide an adequate hardened bearing surface, the sleeves 90, 125, and 190 are used. These sleeves are not subject to bending and torsion loads so that any brittleness inherent in them because of their hardness will not be objectionable; whereas brittleness in the shafts 24, 41, 124 and 141 would be highly objectionable The reason the bearing surfaces are required to be hardened is because of the high load carrying needle bearings 91, 126 and 191 employed. Without hardened surfaces, the rollers of the needle bearings would rapidly wear away the shafts.

*Operation*

In a typical operating cycle the tool will start in the position illustrated in FIG. 1. During the description of this cycle, reference may be made to FIG. 8 for best following the center line positions of the stretcher handle 23 in relation to the operation of various elements within the tool.

The "Start" position is labelled in FIG. 8. In this position the stretcher drive housing 21 has contacted the lifting link 54 and rotated the same counterclockwise, as viewed in FIGS. 2 and 8, to elevate the separator plate 55 above the foot section 20F of the base. The operator may now loop the band about an object to be banded and insert the lower band L under the separator plate to be engaged against the knurled face of the button 52, with the extremity of the lower band also underlying the cantilever arm 78A, and terminating underneath the seal storage magazine 31. The operator now presses the release lever 48 to allow the torsion spring 59 to swing the stretcher assembly to its detent position determined by the detent 60 engaging the chamfered hex head 47H (FIG. 3). This movement of the stretcher housing enables the disk spring 58 to force the separator plate 55 against the lower band L, with the lifting link 54 swinging to accommodate this movement of the separator plate. In the detent position, the rotary dog 42 is slightly above the separator plate 55 and the operator may now feed the supply portion or upper band U between the retainer spring 62 and the separator plate 55.

With the band fully inserted and aligned, the operator pulls the stretcher handle 23 out of detent position causing the torsion spring 59 to drop the rotary dog 42 onto the upper band; where excess band slack exists in the band loop, this may conveniently be pulled out manually by the operator prior to moving the stretcher handle from its detent position.

The stretcher handle is repeatedly swung back and forth about the axis of the shaft 24 to draw tension on the band, and when desired tension is built up, the stretcher handle may be left where it is.

As tension is built up, the holding pawls 51 which are half-stepping pawls repeatedly follow the movements of the teeth 50T of the rotary dog gear and hold it at its established position. The drive pawl 46 rotates freely during reverse swinging movement of the stretcher handle and engages the pinion teeth 24T during forward swinging movement if the pawl is in the position in which it is illustrated in FIG. 6. The pawl 46 is disengaged, if necessary, to facilitate repositioning of the stretcher handle to any desired angle simply by pressing the finger 46F until the pawl is moved to the position illustrated in FIG. 1. Except when manually disengaged, the drive pawl 46 is normally held in its FIG. 6 position by the action of the spring 46S. Return movement of the stretcher arm 23 beyond its normal range of angular tensioning travel brings a depending arm 46A of the pawl against an extension of the shaft 22 to move the pawl 46 to disengaged relation. This is why the pawl appears in disengaged position in FIG. 1.

Should it be desired to relieve tension completely, the stretcher handle 23 is rotated to approximately the "rotary dog contact" position illustrated in FIG. 8 to cause the tang 43T (FIG. 6) to engage the shoulder 49S on the floating plate 49 and move its front edge 49E against the pawls 51 so that both holding pawls 51 are held away from the teeth 50T that comprise the rotary dog gear.

The tensioned band is sealed by rotating the sealer handle 29 through about a 180° swinging movement during which the shaft 30 and its integral pinion teeth 30T undergo rotation and concurrent downward travel to power the drive link 65 against the crosshead 69. The drive link 65 undergoes limited swinging movement as illustrated in FIG. 2C so that during the high force action at the lower end of its travel, the pinion teeth are loaded towards the rack teeth 26T and the crosshead is in broad faced engagement against the wall of the sealer housing 25. The downward travel of the crosshead cocks the seal feed arm 32 and lowers the sealer parts to deposit the seal carried in the jaw lips 81L over the band ends, with the jaws and punches then operating to fold and crimp the seal, while the movable shear blade 80 severs the fully tensioned upper band during final movement.

Where desired, the sealer handle 29 can be actuated after band loading but prior to band tensioning in order to drop the crosshead 69 to its detent position determined by the detent pin 71 (FIG. 2). At this position the surfaces 74S of the side plate 74 embrace the overlapping band ends and guide the tensioning action.

After sealing is completed, both handles are returned to "Start" position to free the sealed band loop, with the stretcher handle being latched in its "Start" position by engagement of the tang 34T against the release lever 48. The tool may be stripped from the sealed band by grasping the stretcher handle ball 23B and pulling laterally away from the band. The tool is immediately ready for another tensioning and sealing cycle.

Advantages

The particular tool embodiment illustrated herein may be constructed in various different size and tension ratings and in a larger form such a tool construction is capable of pulling 3,000 lbs. tension on a 1¼ inch band. Present bands used for such high tension are harder than bands previously in use and the ratio of the normal force to band tension therefore must be higher to maintain tooth penetration on the rotary dog. This normal force loading on the band imposes unusually high stresses on the stretcher drive systems.

The particular stretcher drive systems shown in FIGS. 5 and 5B are well suited to handle the high stresses. Also, maintenance of the stretcher drive systems of FIGS. 5 and 5B is significantly reduced by the wear-resistant sleeve and bearing arrangement. Further, removal of the rotary dog 42 which is replaced most often is simplified in that the nut 41N or 141N, need only be removed to enable removal of the rotary dog shaft 41 or 141, while all the other parts in this arrangement, such as the drive pawl, the rotary dog gear and the holding pawls will remain in place unless purposely removed by removing other fasteners.

Wear-resistant construction features are also provided in the sealer system in that the movable side plates 74 and 75 which are required to provide guide surfaces for the sealer parts may be of heat-treated alloy steel. The stationary shear blade 78 may be of tool steel and guides the front movable side plate 74. The stationary rear side plate 26 may be of heat-treated alloy steel and guides the movable rear side plate 75.

The base pad 79 underlying the sealer and seal storage magazine regions takes the reaction during sealing and shearing. When the base pad 79 is removed, the entire sealer assembly may be removed for replacement upon removal of the crosshead pin 70.

Other advantages of the tool are that it utilizes an arrangement wherein the stretcher assembly is on the operator side of the tool so that the supply end or upper band may be pulled toward the operator for drawing slack from a loose band loop and the shear blade acts at a region which is under full tension. Therefore, it is sufficient to nick the upper band and let the tension achieve final rupture during shearing. The dog marks from the previous sealing cycle are on a portion of the band which is hidden and which is not in the load carrying region of the sealed loop. In addition, the marks on the lower band are due to the action of the knurled button 52 against its underface and are not in sight.

Detent arrangements are employed to simplify tool operation as, for example, the detent pin 60 carried in the side face of the sealer housing 25 engages the stretcher handle 23 as it moves from its "Start" position after loading of the lower band, with the detent 60 defining an intermediate position wherein the lower band is positively held and clearance is available for insertion of the upper band. In addition, the detent 71 located in the crosshead 69 enables the sealing mechanism 27 to be dropped on to the strap to act as a band guide during tensioning. The moving front side plate 74 has depending band guide surfaces that register the band ends and insure their alignment and these are active when the crosshead is at its intermediate position determined by the detent 71.

The sealer drive system utilizes an eccentric power pin 66 carried by the floating drive pinion 30 to move the pin through a cycloidal path P (FIG. 2C) which progressively approaches the crest line CL of the rack teeth 26T to develop a mechanical advantage characteristic which is matched to the force requirements for joint formation and the other operations of the tool. Effective matching is accomplished in the present tool and results in a more uniform application of force on the sealer handle 29 throughout its range of travel. The cycloidal path P of the pin 66 which determines the mechanical advantage also determines the line of reaction through the drive link, so that high reaction is applied through the broad face of the crosshead 69, whereas in the low reaction intervals during initial travel, forces are applied through the shaft mounted rollers 67 (FIGS. 1 and 2). The drive pawl 46 mounted in the stretcher handle 23 may be manually disengaged to permit the operator to reposition the stretcher handle without loss of the tension that has been built up. Finally, tension can be relieved at any time by swinging the stretcher handle to the extreme release position designated in FIG. 8.

Thus, while preferred constructional features of the invention are embodied in the structure illustrated herein, it is to be understood that changes and variations may be made by those skilled in the art without departing from the spirit and scope of the appended claims.

We claim:

1. In a strapping tool for tensioning and sealing together the overlapping strap ends of a strap loop encircled about an object comprising, a frame, a strap support pad on said frame over which the strap is extended, strap gripping and tensioning means on the frame above the strap support pad gripping the strap ends toward the strap support pad and causing one strap end to be moved relative to the other strap end to cause the strap loop to become tensioned onto the object, a hollow housing on the frame located in a fixed position above the strap support pad and adjacent to the strap gripping and tensioning means, said housing having on open lower end, seal joint forming means contained within said hollow housing for sealing together the overlapping strap ends extending over the strap support pad, said strap support pad being detachably secured to said frame so that it can be removed to provide access to the seal joint forming means through said open lower end of the hollow housing.

2. In a strapping tool as defined by claim 1 characterized by said strap support pad being detachably secured to said frame by interlocking engagement therewith.

3. In a strapping tool as defined in claim 1 characterized by said strap support pad being detachably secured to said frame by interlocking engagement therewith and by means of a single removable fastener.

4. In a strapping tool for tensioning and sealing upper and lower overlapping strap ends of a strap loop that encircles an object, a rigid main frame providing a fixed position vertical central chamber, seal storage and feed mechanism on said frame to the rear of the central chamber, a strap support pad on the frame over which the strap ends are supported, and a pivot shaft to the front of the central chamber, a stretcher drive housing mounted to said framing structure at the front of said central chamber to swing about the pivot shaft, tensioning wheel means carried on said stretcher drive housing to rotate about an axis therethrough that is correspondingly swingably carried by the main framing structure, a stretcher handle rotatable on said housing through a first range of swinging movement and rotatable with said housing through an adjacent range of swinging movement, drive pawl means carried on the stretcher handle to engage in driving relation to the tensioning wheel means during swinging movement of the handle in a first rotary direction through said first range of swinging movement, strap joint forming mechanism vertically shiftable through a lower region of said chamber and operable to crimp a seal about said overlapping ends and operable to shear the upper strap end at a location that is under tension, drive mechanism in the upper region of said chamber connected to the strap joint forming mechanism, a sealer handle rotatable about an axis through the drive mechanism to lower the same and actuate the strap joint forming mechanism, and detent means cooperable between said strap joint forming mechanism and said main framing structure to locate the strap joint forming mechanism at an intermediate position in guiding alignment with the overlapping strap ends supported on the strap support pad.

5. In a strapping tool for tensioning and sealing upper and lower overlapping strap ends of a strap loop that encircles an object, a main frame providing a vertical central chamber, seal storage and feed mechanism to the rear of the central chamber, and a pivot shaft to the front of the central chamber, a stretcher drive housing mounted to said framing structure at the front of said central chamber to swing about the pivot shaft, tensioning wheel means carried on said stretcher drive housing to rotate about an axis therethrough that is correspondingly swingably carried by the main framing structure, a stretcher handle rotatable on said housing through a first range of swinging movement and rotatable with said housing through an adjacent range of swinging movement, drive pawl means carried on the stretcher handle to engage in driving relation to the tensioning wheel means during swinging movement of the handle in a first rotary direction through said first range of swinging movement in order to tension the strap loop, holding pawl means carried by the stretcher drive housing to retain the tensioning wheel means against reverse rotation, a manual release lever carried by the stretcher handle and shiftable to disengage the drive pawl means to allow free adjustment of the stretcher handle within its range of swinging movement, joint forming mechanism vertically shiftable through a lower region of said chamber and operable to crimp a seal about said overlapping ends and operable to shear the upper strap end portion of the strap loop at a location that is under tension, joint forming drive mechanism in the upper region of said chamber and connected to the seal forming mechanism, and a sealer handle rotatable about an axis through the joint forming drive mechanism to lower the same and actuate the joint forming mechanism.

6. In a strapping tool for tensioning a strap loop encircled about an object comprising, a tensioner drive housing, a wear resistant sleeve mounted in said housing, a drive shaft journalled in said housing and passing axially through said sleeve, a drive gear journalled on said sleeve and secured in driving engagement with said drive shaft, and a tensioning wheel secured in driven engagement on said drive shaft.

7. In a strapping tool as defined by claim 6 characterized by said sleeve being mounted in a fixed position in said housing so that it is prevented from rotation relative to the housing.

8. In a strapping tool for tensioning upper and lower overlapping strap ends of a strap loop that encircles an object, a tensioner drive housing, a wear resistant sleeve fixed in said housing and having an end portion projecting through one side of the housing, a drive gear journalled on said end portion, said drive gear having a hub portion extending beyond said end portion, a drive shaft extending full length through said sleeve and having one end in rotatably driven engagement with the drive gear hub portion and its other end terminating adjacent the opposite side of the housing, a tensioning wheel in removable rotatably driven engagement with an intermediate region along said small diameter end, and a fastener releasably mounted on the extremity of said small diameter end to retain the parts in normal operation, said fastener being removable to allow endwise withdrawal of the drive shaft from said tensioning wheel and from said sleeve.

9. In a strapping tool for tensioning upper and lower overlapping strap ends of a strap loop that encircles an object, a tensioner drive housing, a wear resistant sleeve fixed in said housing and having an end portion projecting through one side of the housing, a drive gear journalled on said end portion and having a hub extending beyond said end portion, a drive shaft extending full length through said sleeve and having an exposed large diameter end in rotatably driven engagement with the drive gear hub and an exposed small diameter end terminating adjacent the opposite side of the housing, a tensioning wheel in removable rotatably driven engagement with an intermediate region along said small diameter end, a pair of annular wear resistant bearings journalling said drive shaft in said housing in flanking relation to the tensioning wheel, and a fastener releasably mounted on the extremity of said small diameter end to retain the parts in normal operation, said fastener being removable to allow endwise withdrawal of the drive shaft from said tensioning wheel and from said sleeve.

10. In a strapping tool for tensioning upper and lower overlapping strap ends of a strap loop that encircles an object, a tensioner drive housing, a wear resistant sleeve fixed in said housing and having an end portion projecting through one side of the housing, an annular array of needle bearings journalled on said end portion and having anti-friction thrust engagement with said housing, a drive gear journalled on said needle bearings and having a hub extending beyond said sleeve end portion, a drive shaft extending full length through said sleeve and having an exposed large diameter end in rotatably driven engagement with the drive gear hub and an exposed small diameter end terminating adjacent the opposite side of the housing, a tensioning wheel in removably rotatably driven engagement with an intermediate region along said small diameter end, and a fastener releasably mounted on the extremity of said small diameter end to retain the parts in normal operation, said fastener being removable to allow endwise withdrawal of the drive shaft from said tensioning wheel and from said sleeve.

11. In a strapping tool for tensioning upper and lower overlapping strap ends of a strap loop that encircles an object, a tensioner drive housing, a wear resistant sleeve fixed in said housing and having an end portion projecting through one side of the housing, an annular array of needle bearings journalled on said end portion and having anti-friction thrust engagement with said housing, a drive gear journalled on said needle bearings and having a hub extending beyond said sleeve end portion, a drive shaft extending full length through said sleeve and having an exposed large diameter end in rotatably driven engagement with the drive gear hub and an exposed small diameter end terminating adjacent the opposite side of the housing, a tensioning wheel in removably rotatably driven engagement with an intermediate region along said small diameter end, a pair of annular wear resistant bearings journalling said drive shaft in said housing in flanking relation to the tensioning wheel, and a fastener releasably mounted on the extremity of said small diameter end to retain the parts in normal operation, said fastener being removable to allow endwise withdrawal of the drive shaft from said tensioning wheel and from said sleeve.

12. In a strapping tool for tensioning upper and lower overlapping strap ends of a strap loop that encircles an object, rigid main framing structure having a contact foot engageable with the object to receive said strap ends in overlying relation, a pivot shaft mounted on said main framing structure, a stretcher drive housing carried on said framing structure in pivotal mounting on said shaft to swing generally towards and away from said contact foot, a drive shaft rotatably carried in said stretcher drive housing in driving engagement with a tensioning wheel carried thereon to overlie the upper strap end, a pair of annular wear resistant bearings journalling said drive shaft in said housing in flanking relation to the tensioning wheel, and a stretcher handle rotatable on said housing at an end thereof remote from the tensioning wheel and operable in one direction of swinging movement to rotate said drive shaft.

13. In a strapping tool for tensioning upper and lower overlapping strap ends of a strap loop that encircles an object, rigid main framing structure having a contact foot engageable with the object to receive said strap ends in overlying relation, a pivot shaft mounted on said main framing structure, a tensioner drive housing carried on said framing structure in pivotal mounting on said shaft to swing generally towards and away from said contact foot, a wear resistant sleeve fixed in said housing and having an end portion projecting therefrom at one side, a drive gear journalled on said end portion and having a hub extending beyond said end portion, a drive shaft extending full length through said sleeve and having an exposed large diameter end in rotatably driven engagement with said drive gear and an exposed small diameter end terminating adjacent the opposite side of the housing, a tensioning wheel in removable rotatably driven engagement with an intermediate region along said small diameter end and a fastener releasably mounted to said small diameter end to retain the parts in normal operation, said fastener being removable to allow endwise withdrawal of the drive shaft from said tensioning wheel and from said sleeve.

14. In a strapping tool for tensioning upper and lower overlapping ends of a strap loop that encircles an object, a tensioner drive housing having a lateral open gear box section and a sleeve section in side by side relation, a pinion shaft journalled in said sleeve section and having one end projecting into said gear box section, a pinion gear on said shaft end, a wear resistant sleeve fixed in said housing and having an end portion projecting through one side of the housing, a drive gear journalled on said end portion in meshing relation with the pinion gear and having a hub extending beyond said end portion, and a drive shaft extending through said sleeve and having one end in rotatably driven engagement with the drive gear hub and an opposite end carrying a tensioning wheel in rotatably driven engagement.

15. In a strapping tool for forming a joint between the upper and lower overlapping strap ends of a strap loop that encircles an object, framing structure providing a vertical central chamber, joint forming mechanism including a crosshead vertically shiftable through an intermediate region of said chamber, a joint forming drive mechanism in the upper region of said chamber and connected to shift the crosshead, said joint forming drive mechanism including a vertical run of rack teeth fixed on said framing structure to border said chamber and a floating drive pinion meshing with and rotatable along the run of rack teeth, said pinion having a pivot movable along a cycloidal path upon rotation of said pinion along said rack teeth, a drive link pivoted at its one end to said pivot and pivoted at its other end to said crosshead.

16. In a strapping tool for forming a joint between the upper and lower overlapping strap ends of a strap loop that encircles an object, framing structure providing a vertical central chamber, joint forming mechanism including a crosshead vertically shiftable through an intermediate region of said chamber, a joint forming drive mechanism in the upper region of said chamber connected to shift the crosshead, said joint forming drive mechanism including a vertical run of rack teeth fixed on said framing structure to border said chamber, a floating drive pinion meshing with and rotatable along the run of rack teeth, said pinion having a pivot movable along a cycloidal path upon rotation of said drive pinion, said path approaching said rack teeth during most of the rotation of the pinion to progressively increase the effective mechanical advantage of the drive mechanism during its operation.

17. In a strapping tool for forming a joint between the upper and lower overlapping strap ends of a strap loop that encircles an object, framing structure providing a vertical central chamber, joint forming mechanism including a crosshead vertically shiftable through an intermediate region of said chamber, a joint forming drive mechanism in the upper region of said chamber and connected to shift the crosshead, and a sealer handle rotatable about an axis through the sealer drive mechanism, said sealer drive mechanism including side by side spaced sets of vertical runs of rack teeth fixed on said framing structure to border said chamber, a floating drive pinion rotatable with the sealer handle and meshing with both sets of rack teeth, said pinion having an intermediate pivot movable along a cycloidal path upon rotation of said pinion, and a drive link pivoted at its one end to said pivot and pivoted at its other end to said crosshead to swing past vertical center towards the rack teeth as the drive pinion moves downwardly in said chamber.

18. In a strapping tool for forming a joint between the upper and lower overlapping strap ends of a strap loop that encircles an object, framing structure providing a vertical central chamber, joint forming mechanism including a crosshead vertically shiftable through an intermediate region of said chamber, a joint forming drive mechanism in the upper region of said chamber connected to shift the crosshead, and a sealer handle rotatable about an axis through the joint forming drive mechanism, said framing structure including a vertical wall presenting a smooth slide surface facing the chamber and flanked by rollways, side by side spaced sets of vertical runs of rack teeth fixed on said framing structure and bordering said chamber in opposed relation to the vertical wall, a shaft rotatable with the sealer handle and carrying a pinion meshing with both sets of rack teeth, said shaft carrying rollers engageable with said rollways and said pinion having an intermediate pivot movable along a cycloidal path upon rotation of said drive pinion, said path approaching said rack teeth during most of the rotation of the pinion to progressively increase the effective mechanical advantage of the drive mechanism in a generally matched relationship to the forces required for joint formation, and a drive link pivoted at its one end to said pivot and at its other end to said crosshead to swing past vertical center towards the rack teeth as the drive pinion moves downwardly in said chamber, with the link initially transmitting reaction force to hold the rollers against the rollways and the pinion against the rack teeth, and on swinging over the vertical center transmitting reaction to hold the crosshead against said slide surface.

19. In a strapping tool for tensioning a strap loop onto an object by relative movement between the overlapping supply strap end and the leading strap end of a strap loop comprising, a frame, a shear means mounted on the frame for severing the supply strap end from the strap loop, said shear means having a first shear blade and a second shear blade movable across said shear blade to cause a strap end positioned between the shear blades to be severed, a strap support pad on the frame extending below the first shear blade, resilient means mounted between the strap support pad and the first shear blade to apply a separating force between the first shear blade and the strap support pad, shearing movement between the shear blades causing the separating force to be overcome and the first shear blade to move toward the strap support pad as a backup support for the first shear blade.

20. In a strapping tool for tensioning a strap loop onto an object by relative movement between the overlapping supply strap end and the leading strap end of a strap loop comprising a frame, a shear means mounted on the frame for severing the supply strap end from the strap loop, said shear means having a first shear blade and a second shear blade movable across said first shear blade to cause a strap end positioned between the shear blades to be severed, a strap support pad on the frame extending below the first shear blade by a distance to allow spacing between the first shear blade and the strap support pad equal to at least a single thickness of the strap of the strap loop, resilient means mounted between the strap support pad and the first shear blade to maintain said spacing, shearing movement of the second shear blade across the first shear blade causing said resilient means to be overcome and the first shear blade to bottom toward said strap support pad.

21. In a strapping tool for forming an interlocking joint between overlapping strap ends and an inverted channel shaped seal having a crown portion connected between two depending leg portions comprising, a frame, a seal magazine on said frame for housing a stack of inverted channel shaped seals in a superimposed relation, a closure plate at the lower end of the seal magazine for supporting the stack by means of the lowermost seal in the stack, a joint forming mechanism located on the frame on one side of the seal magazine, and a seal feed means located on the frame on the opposite side of the seal magazine, said seal feed means having a seal feed bar with its end engageable with said lowermost seal, means for actuating said seal feed means to cause said seal feed bar to feed the lowermost seal into the actuating portions of the joint forming mechanism while being guided by guide portions on the closure plate, the guide portions on the closure plate being positioned and shaped to guide either of two different width seals.

22. In a strapping tool as defined by claim 21 comprising, said joint forming means being movable between an elevated retracted position and a downward joint forming position with said actuating portions in alignment with the overlapping strap ends on which a joint is to be formed, said end of the seal feed bar being sloped as a camming surface along which the lowermost seal fed by the seal feed bar into the actuating portions of the joint forming mechanism can be cammed by downward movement of the joint forming mechanism to cause both the seal to be centered within said actuating mechanism and the seal feed bar to be retracted clear of the joint forming mechanism path.

23. In a strapping tool for tensioning the overlapping first and second strap ends of a strap loop encircled about an object comprising, a frame, a support pad on the frame over which the first strap end is extended, a first strap gripper mounted on said frame to overlay said first strap end and grip it against the support pad, a second strap gripper mounted on the frame above the first strap gripper in a position to grip the second strap end against the first strap gripper, a downwardly extending sloped projection providing a bell-mouth on the frame positioned remotely of the first and second strap grippers to facilitate guiding of the second strap end into proper position overlaying the first strap gripper without interference from the first strap end positioned below the first strap gripper.

24. In a joint forming mechanism for forming an interlocking joint between overlapping straps comprising, a housing, a stationary bridge attached to said housing, jaws and punches mounted to the housing on pivots located on both sides of the bridge, the lower ends of the jaws being recessed to accommodate first edge portions of the overlapping straps and hold them in alignment with the bridge when the lower ends of the jaws are moved toward each other, the lower ends of the punches being provided with sloped surfaces which react against other edge portions of the overlapping straps to shear them away from the first edge portions when the punches are moved toward each other.

25. The joint forming mechanism defined by claim 24 characterized by said sloped surfaces on oppositely positioned punches being convergent downwardly to cause the other edge portions of the straps to be sheared upwardly away from the first edge portions.

26. The joint forming mechanism defined by claim 24 characterized by, said jaws being connected at their upper ends to a toggle linkage, and means to drive said toggle linkage to cause pivotal movement of the jaws, said toggle linkage having portions positioned to contact the upper ends of the punches after the jaws are substantially brought together so that the punches are actuated to shear said other edge portions of the straps when the jaws are in substantially full engagement with the first edge portions.

27. In a joint forming mechanism defined by claim 24 characterized by, a strap shear means mounted on said joint forming mechanism to be actuated to shear the strap upon substantial completion of the interlocking joint between the overlapping strap, said jaws being connected at their upper ends to a toggle linkage and said punches having their upper ends in the path of movement of the toggle linkage, and drive means to drive said toggle linkage to cause pivotal movement of said jaws and said punches toward each other, said drive means dimensioned to cause the toggle to override and reverse movement of the jaws away from each other during the shearing movement of the strap shear means to thereby relieve the drive force from the jaws and punches and make more drive force available for actuation of the strap shear means.

28. In a joint forming mechanism for forming an interlocking joint between overlapping straps comprising, a housing, a stationary bridge attached to said housing, jaws mounted to the housing on pivots located on both sides of the bridge, the lower ends of the jaws being recessed to accommodate first edge portions of the overlapping straps and hold them in alignment with the bridge when the lower ends of the jaws are moved toward each other, punches pivoted at their upper ends in toggle fashion to a fixed pivot on the housing and provided at their lower ends with grooves, said grooves being fitted with guide rollers journalled on the jaws so that angular movement of the jaws on their pivots causes the punches to be moved angularly about their pivot as the guide rollers are guided along said grooves, the upper ends of the jaws being connected to a drive means for causing angular movement of the jaws.

References Cited

UNITED STATES PATENTS

| | | | |
|---|---|---|---|
| Re. 26,114 | 11/1966 | Leslie | 254—51 |
| 2,336,264 | 12/1943 | Leslie | 140—93.4 |
| 3,169,011 | 2/1965 | Rutty | 254—51 |
| 3,194,281 | 7/1965 | Frey et al. | 140—93.2 |
| 3,198,218 | 8/1965 | Ericsson et al. | 140—93.4 |
| 3,291,163 | 12/1966 | Timmerbeil | 140—93.2 |

CHARLES W. LANHAM, *Primary Examiner.*

E. M. COMBS, *Assistant Examiner.*